United States Patent
Tu et al.

(10) Patent No.: US 6,892,225 B1
(45) Date of Patent: May 10, 2005

(54) AGENT SYSTEM FOR A SECURE REMOTE ACCESS SYSTEM

(75) Inventors: Edgar Allen Tu, Castor Valley, CA (US); Eric Pang, Sunnyvale, CA (US)

(73) Assignee: fusionOne, Inc., San Jose, CA (US)

( * ) Notice: Subject to any disclaimer, the term of this patent is extended or adjusted under 35 U.S.C. 154(b) by 492 days.

(21) Appl. No.: 09/618,955

(22) Filed: Jul. 19, 2000

(51) Int. Cl.$^7$ ............................................. G06F 15/16
(52) U.S. Cl. ...................... 709/217; 709/203; 709/218; 709/219; 713/165; 713/155; 713/201
(58) Field of Search ................................ 709/203, 217, 709/218, 219; 713/165, 201, 155

(56) References Cited

U.S. PATENT DOCUMENTS

| | | | | |
|---|---|---|---|---|
| 5,329,619 A | * | 7/1994 | Page et al. | 709/203 |
| 5,933,816 A | * | 8/1999 | Zeanah et al. | 705/35 |
| 5,970,149 A | * | 10/1999 | Johnson | 714/46 |
| 6,061,796 A | * | 5/2000 | Chen et al. | 713/201 |
| 6,189,096 B1 | * | 2/2001 | Haverty | 713/155 |
| 6,499,108 B1 | * | 12/2002 | Johnson | 713/201 |
| 6,535,743 B1 | * | 3/2003 | Kennedy et al. | 455/456.1 |
| 6,584,454 B1 | * | 6/2003 | Hummel et al. | 705/59 |
| 2001/0047471 A1 | * | 11/2001 | Johnson | 713/1 |
| 2002/0016912 A1 | * | 2/2002 | Johnson | 713/165 |

* cited by examiner

*Primary Examiner*—Nabil El-Hady
(74) *Attorney, Agent, or Firm*—Vierra Magen Marcus Harmon & DeNiro LLP

(57) ABSTRACT

A secure agent system for communicating with a secure remote access system is disclosed. The agent system is suitable for execution on a base device which is configured to be coupled to the internet. The agent system initiates data communication with the remote access system by sending requests and receiving replies from the remote access system. The replies may include requests to retrieve, store, update, and/or delete data associated with the base device, which the agent system carries out. The agent system further provides reply data to such requests to the remote access system.

9 Claims, 5 Drawing Sheets

AGENT SYSTEM FOR A SECURE REMOTE ACCESS SYSTEM

RELATED APPLICATIONS

BACKGROUND OF THE INVENTION

1. Field of the Invention

This invention pertains generally to remote access systems. More particularly, the invention is an agent system for communicating secure data to a secure remote access system.

2. The Prior Art

In general, remote access systems allow a "remote" user (from a remote computer) to connect to and access resources on another computer. For example, a user on a mobile computer may connect to and access resources on a home computer via conventional remote access systems. However, prior art remote access systems require special application software to be supplied to both the remote system and the base system. Due to this shortcoming, most prior art remote access systems are limited to devices including substantial computing capabilities in the remote computer. Also, access to another computer via a remote access system is provided using conventional data connection means, typically through a PSTN (public switched telephone network) connection. That is, a direct connection from the remote computer to the base computer is typically required for security reasons.

Remote access systems can generally be categorized into two types of systems. The first system is generally referred to as a remote access server (RAS) system. A RAS system usually comprises server RAS software residing on a RAS server and client RAS software residing on a "remote" computer. The RAS server is coupled to resources (e.g., printers, files, other nodes) which are remotely accessed by a user of the system. In operation, a user of the remote computer connects to the RAS server via a dial-in telephone connection. Upon connection, the RAS server queries for the user's access credentials (e.g., user name and password). Upon authentication of the user's access credentials, the user is granted access to resources on the RAS server and/or resources on other nodes connected to the RAS server to which the user is authorized access. The RAS software manages the connection process, the authentication process, the access privileges, and the data transfers between the RAS server and the remote computer. RAS systems are also used by commercial service providers, such as Internet Access Providers (ISPs) to allow their customers access into their network resources.

In another implementation, RAS systems may be used in conjunction with an Internet connection. In this scheme, a user is able to access a RAS server indirectly via the Internet, rather than directly via a point to point telephone connection. These RAS systems are generally referred to as virtual private networks (VPNs), because a secure channel is provided via the normally unsecured Internet. In VPNs, a remote user having a computer operatively coupled to the VPN, is able to access resources on another computer via the Internet using Internet protocols.

The other type of remote access system is generally referred to as a remote control system (RCS). RCSs allow a remote user to not only access resources on another "host" computer, but also allow the user to control the host computer. RCSs typically display on the remote computer what would normally be displayed on the host computer (known as screen emulation). In this way, the user is able to control the host computer from the remote computer as if the user was directly accessing the host computer. An example of a commercially available RCS product is PC Anywhere™ by Symantec Corp.™. Like RAS systems, RCS allows a remote user to connect via a conventional means, including a telephone connection and via the Internet. Again, special software is required on both nodes.

There are several disadvantages with RAS and RCS systems. In RAS systems, file synchronization poses a common problem, particularly with respect to email applications. For example, where a remote user-downloads email to the remote computer it may be stored on the remote computer. Thus, when the user gets back to the local computer, that email is not accessible on the remote computer, but must somehow be transferred from the remote computer or disregarded. This can become quite frustrating to the user.

In addition, in RAS implementations certain files may be unusable without the original application. For example, with certain email applications, the messages associated with the email application are commonly stored in a proprietary file format. Without the original email application, the file would be unusable to the remote user if the original application is not installed on the remote computer accessed by the user.

RCS, on the other hand, typically requires proprietary software to be installed on both the server (host) and client (remote) computers. Proprietary software limits the ability of a remote user to access the host computer, because such proprietary software may not be readily accessible.

In addition, often the setup and administration of RAS and RCS systems are cumbersome or otherwise overwhelming for the home or corporate users. Setup normally involves the assistance of a network system administrator and is usually complicated further by the fact that each user may have different remote computers and different host computers. Each setup then becomes unique and difficult.

Copending application Ser. No. 09/618,954 entitled METHOD AND APPARATUS FOR A SECURE REMOTE ACCESS SYSTEM, filed Jul. 19, 2000, describes a method and system for remote and secure access to a host computer, and which further provides an open application standard for client access to a host (base) device. In this co-pending application, a plurality of user server modules is provided to manage communication between the remote access device and the base device. The remote access device provides an open standard application such as a web browser for viewing data and issuing commands. The user server modules communicate with the base device to provide information from the base device to a user of the remote access device.

Accordingly, there is a need for an agent system and method residing on a base device which provide secure communication between the base device and user server module of a remote access system. The present invention satisfies these needs, as well as others, and generally overcomes the deficiencies found in the background art.

BRIEF DESCRIPTION OF THE INVENTION

The present invention is an agent system and method residing on a base device which provides secure communication between the base device and one or more user server modules. The agent generally comprises software code or algorithm which is executed within the base device for carrying out the acts described herein.

The invention further relates to machine readable media on which are stored embodiments of the present invention. It is contemplated that any media suitable for retrieving instructions is within the scope of the present invention. By way of example, such media may take the form of magnetic, optical, or semiconductor media. The invention also relates to data structures that contain embodiments of the present invention, and to the transmission of data structures containing embodiments of the present invention.

In general, the agent system is suitable for execution on a base device which is configured to be coupled to the internet. The agent system initiates data communication with the remote access system by sending requests and receiving replies from the remote access system. The replies may include requests to retrieve, store, update, and/or delete data associated with the base device, which the agent system carries out. The agent system further provides reply data to such requests to the remote access system.

Copending application Ser. No. 09/618,956 entitled REMOTE ACCESS COMMUNICATION ARCHITECTURE APPRATUS AND METHOD, filed Jul. 19, 2000, which is expressly incorporated herein by reference, describes a system architecture and method suitable for use with the present invention.

An object of the invention is to provide an agent system which overcomes the deficiencies found in the prior art.

Another object of the invention is to provide an agent system which communicates securely to a remote access system by initiating communication with the remote access system.

Further objects and advantages of the invention will be brought out in the following portions of the specification, wherein the detailed description is for the purpose of fully disclosing the preferred embodiment of the invention without placing limitations thereon.

BRIEF DESCRIPTION OF THE DRAWINGS

The present invention will be more fully understood by reference to the following drawings, which are for illustrative purposes only.

DETAILED DESCRIPTION OF THE PREFERRED EMBODIMENTS

Persons of ordinary skill in the art will realize that the following description of the present invention is illustrative only and not in any way limiting. Other embodiments of the invention will readily suggest themselves to such skilled persons having the benefit of this disclosure.

Figure 1:
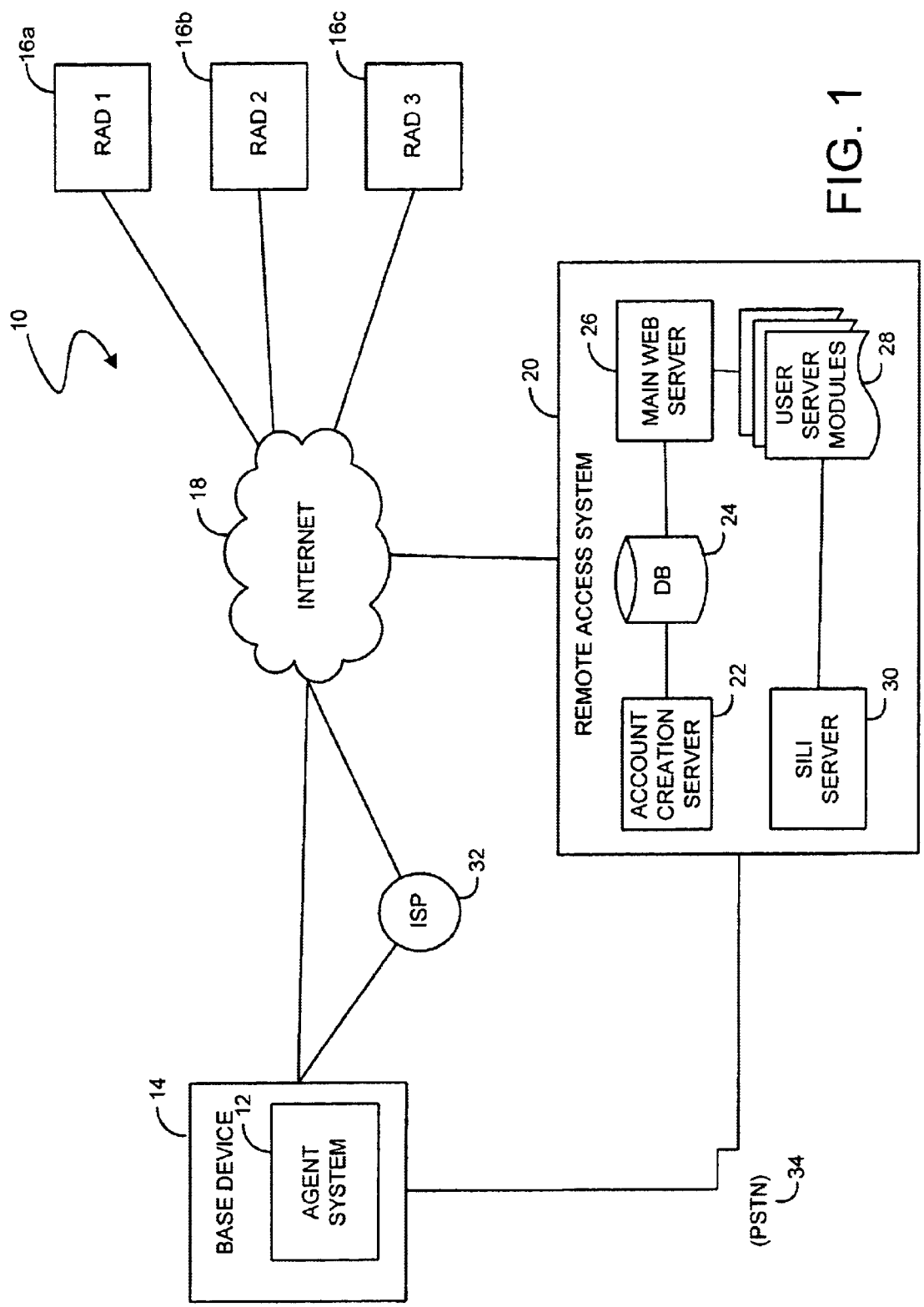
FIG. 1 is a functional block diagram of a system including the agent system in accordance with the present invention
Figure 2:
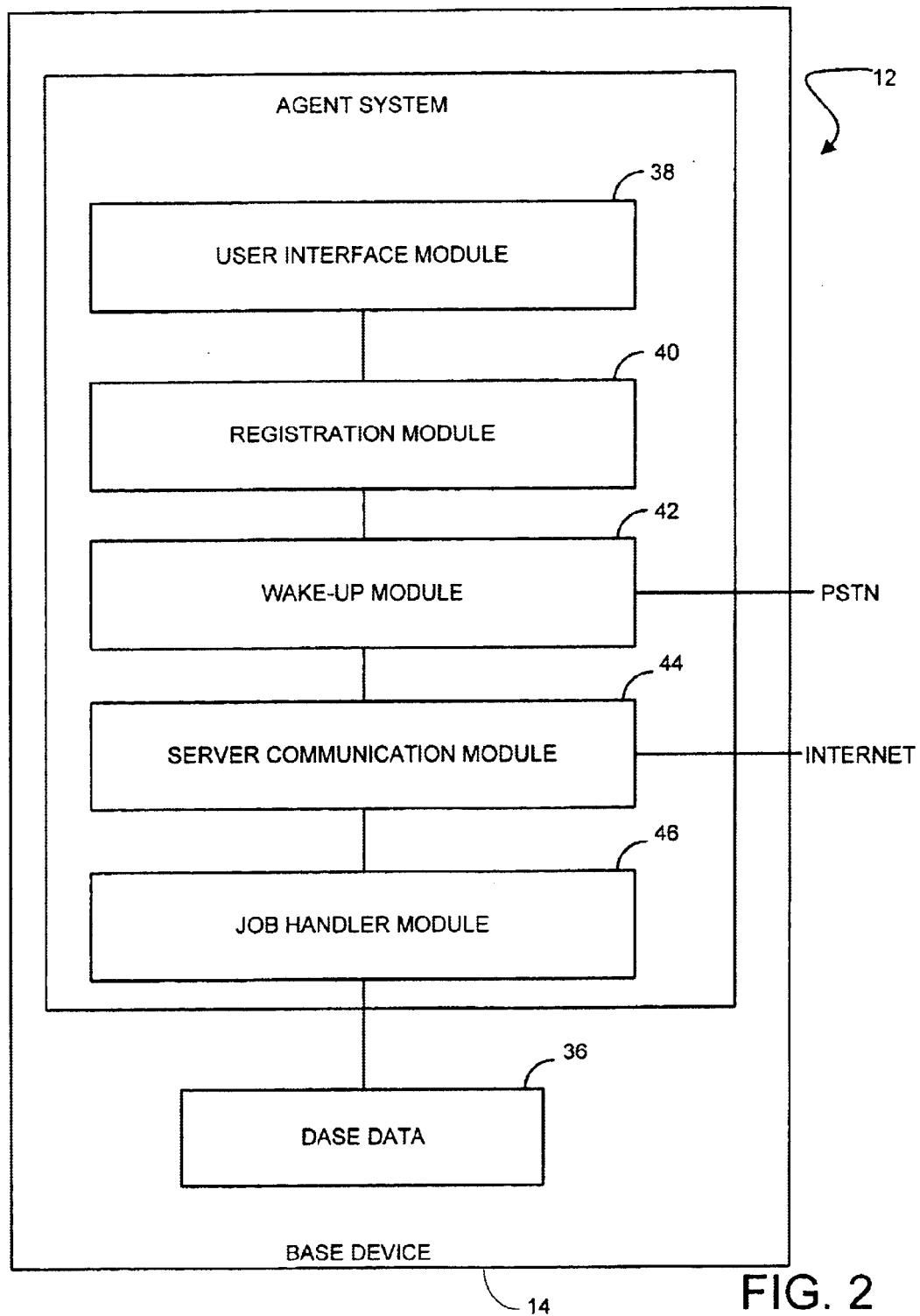
FIG. 2 is a functional block diagram of the agent system in accordance with the present invention.
Figure 3:
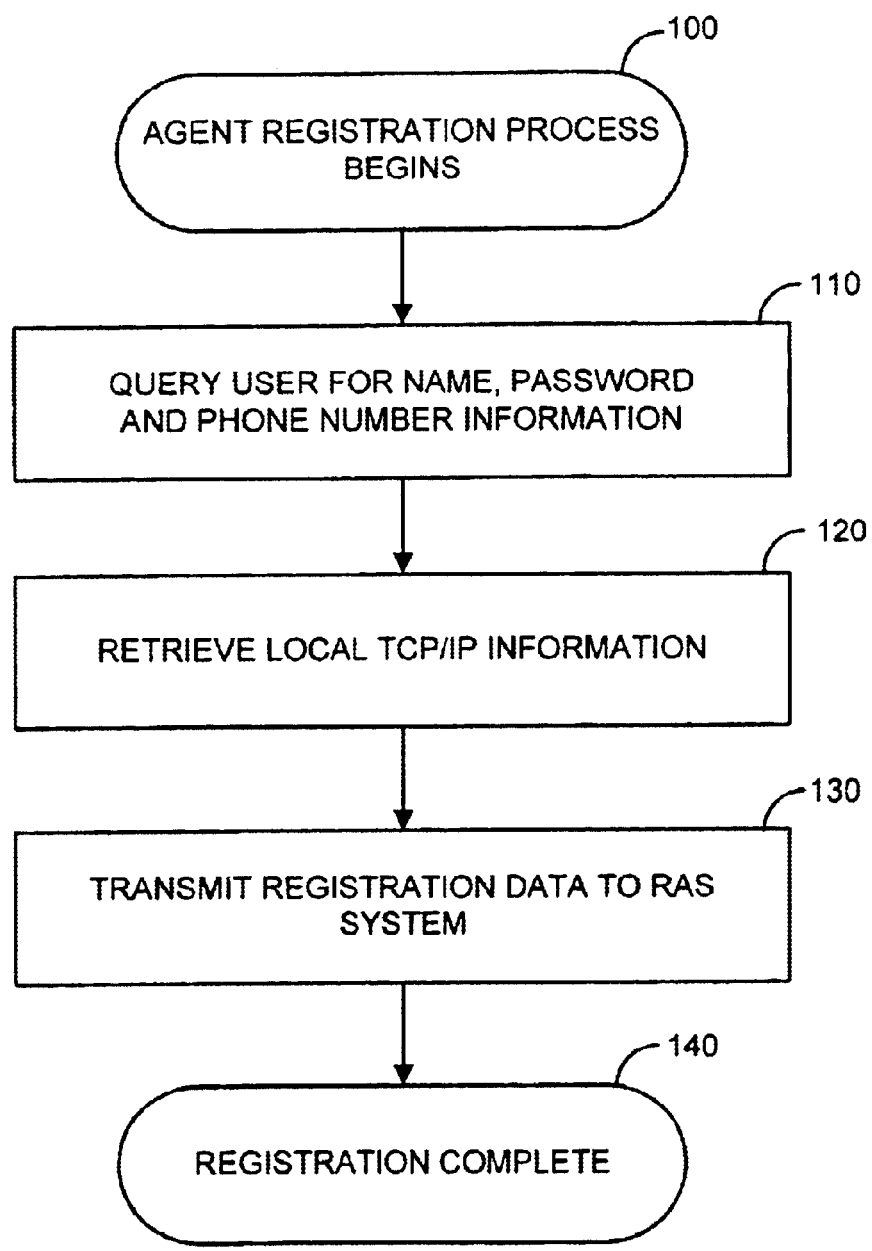
FIG. 3 is a flow chart depicting the registration process of the agent system in accordance with the present invention.
Figure 4:
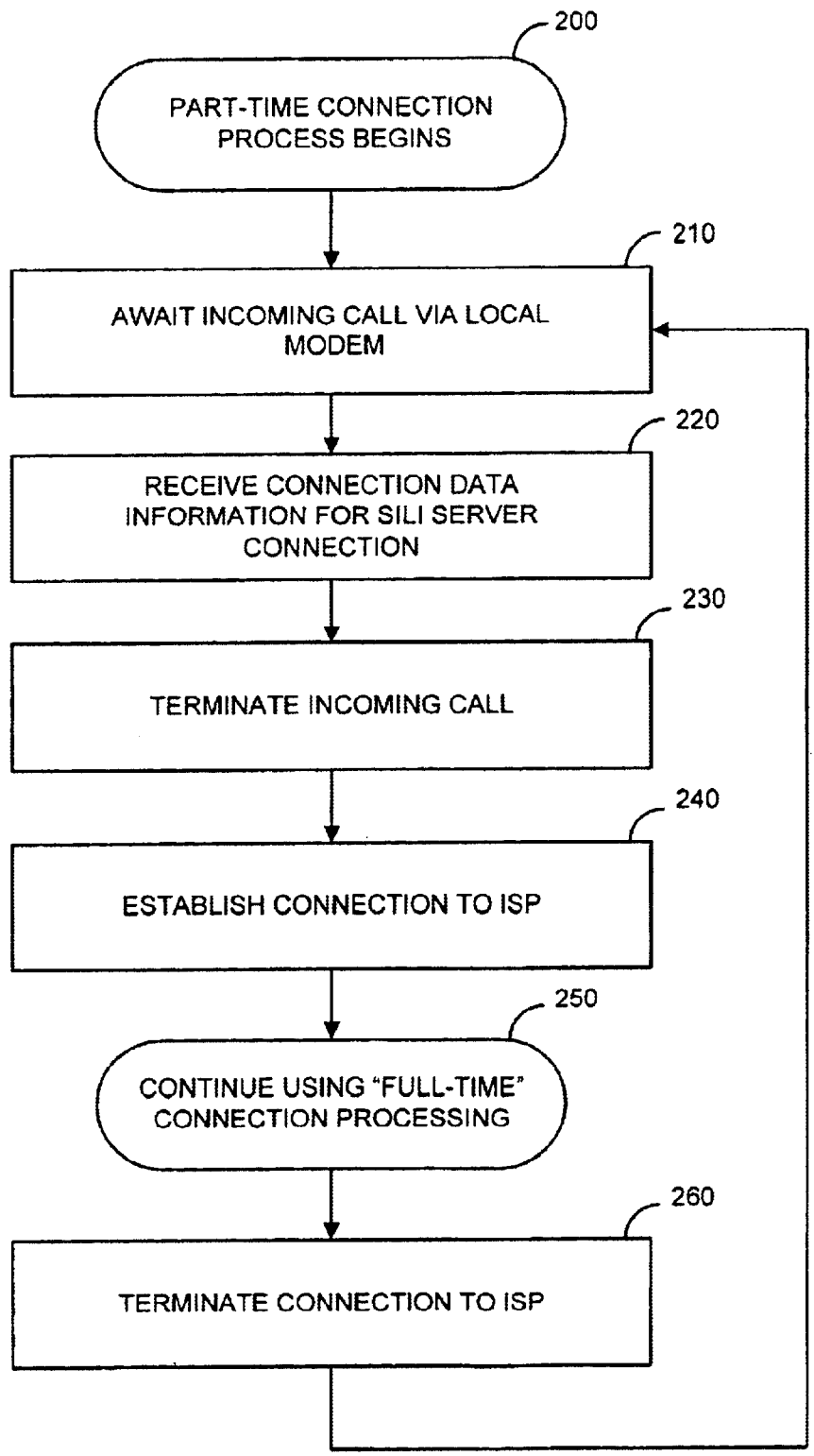
FIG. 4 is flow chart depicting the part-time connection process of the agent system in accordance with the present invention.
Figure 5:
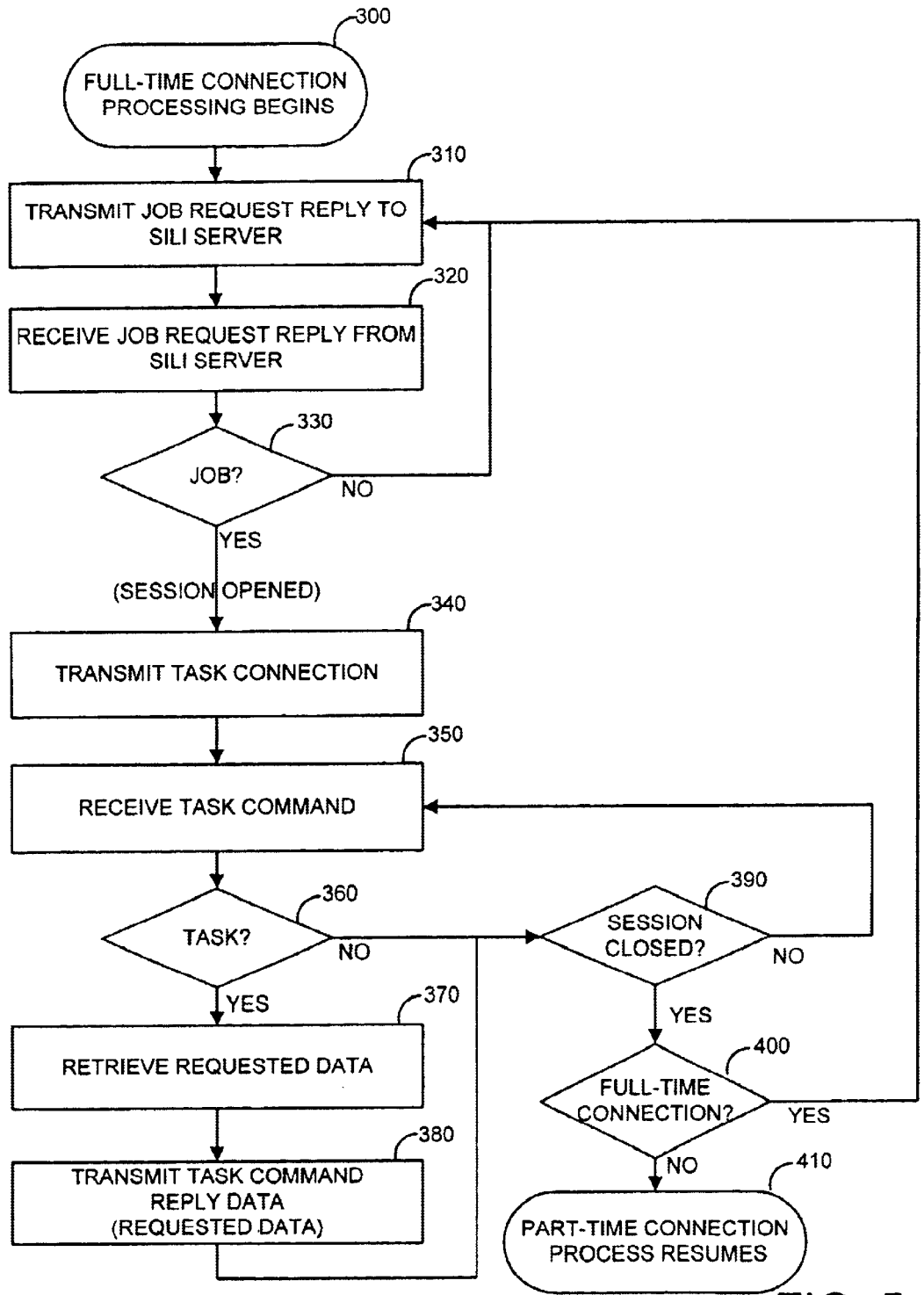
FIG. 5 is a flow chart depicting the full-time connection process of the agent system in accordance with the present invention.

Referring more specifically to the drawings, for illustrative purposes the present invention is embodied in the apparatus shown FIG. 1 and FIG. 2 and the method outlined in FIG. 3 through FIG. 5. It will be appreciated that the apparatus may vary as to configuration and as to details of the parts, and that the method may vary as to details and the order of the steps, without departing from the basic concepts as disclosed herein. The invention is disclosed generally in terms of agent system for a base device, although numerous other uses for the invention will suggest themselves to persons of ordinary skill in the art.

Referring first to FIG. 1, there is a shown a block diagram of a system 10 including the agent system 12 of the present invention operating within a base device 14. Although shown with a single base device for simplicity, in practice system 10 will typically include a plurality of base devices, each having the agent system of the present invention operating therein. The agent system 12 is described more fully below in conjunction with FIG. 2 through FIG. 5. In general, the agent system 12 is embodied in software executed by the base device 14 and carries out the operation described herein.

The base device 14 may comprise one or more data processing means capable of running the agent system 12. For example, the base device 14 may be a home computer to which a remote user is connecting remotely. As another example, the base device 14 may be a network of computers (such as a corporate LAN (local area network) to which a remote is user is connecting remotely. It will is be readily apparent to those skilled in the art having the benefit of this disclosure that other data processing means may further be configured as base device 14 including for example, a personal digital assistance (such as a Windows CE™ palmtop) or a laptop or notebook computer.

The system 10 further includes one or more remote access devices (RAD 1 (16a) through RAD 3 (16c)) which may be configured to be connected to the Internet 18 for access to the base device 14. RADs 16a through 16c may be any data processing means suitable for executing a web browser and connecting to the Internet 18. For example, a conventional computer, a laptop computer, a mobile telephone, a personal digital assistant (PDA), or other Internet appliance (such as Web TV™) may be used as the RAD of the invention.

A remote access system 20 is provided to link a user of a RAD device to a base device. The remote access system 20 carries out the operation of providing an open application standard for remote access from the RAD (16a through 16c) to the base device 14. That is, users of RAD (16a through 16c) do not access base devices directly, but rather indirectly via the remote access systems. Co-pending application Ser. No. 09/618,954 entitled METHOD AND APPARATUS FOR A SECURE REMOTE ACCESS SYSTEM, filed Jul. 19, 2000, describes more fully this method and system for remote and secure access to a base device and is expressly incorporated herein by reference.

In general, remote access system 20 includes an account creation server 22 coupled to a database (DB) 24 which is further coupled to a main web, server 26. A plurality of user server modules 28 is also coupled to the main web server and to a sili server 30. As noted above, account creation server 22, database (DB) 24, main web server 26, user server modules 28 and sili server 30 are described more fully in co-pending application Ser. No. 09/618,954 entitled METHOD AND APPARATUS FOR A SECURE REMOTE ACCESS SYSTEM, filed Jul. 19, 2000.

The base device 14 may be configured to have a full-time, or alternatively, a part-time connection to the Internet 18. For example, where a corporate LAN is configured as base device 14, the base device 14 may be configured with a high-speed (e.g. T1) connection to the Internet 18 which is maintained in a substantially constant manner. Where the base device 14 is configured for full-time connection to the Internet, the agent system 12 periodically communicates with the sili server 30 of the remote access system 20 (via the Internet 18) to determine if there are pending jobs for the agent system 12 to perform. This process is described more fully below in conjunction with FIG. 5.

The base device 14 may be configured for a part-time connection to the Internet 18 such as, for example, where the base device is a home computer which establishes a connection to the Internet 18 via an internet service provider. (ISP 32) and a modem (dial-up) connection. In this case, the agent system 12 awaits for a signal from the sili server 30 to connect to the remote access system 20. In general, the agent system 12 monitors the local modem (not shown) to receive a "wake-up" signal from the sili server 30 via PSTN 34. When this "wake-up" signal is received, the agent system 12 terminates the PSTN connection 34 and connects to the ISP 32 to establish a connection to the Internet 18. Once this internet connection is established, the agent system 12 connects to the remote access system 20 to provide services to the remote user via one of the RAD (16a through 16c) and as described in further detail below. In either arrangement (part-time or full-time connection), the invention provides that data communication between the base device 14 and the remote access system 20 be initiated by the base device 14 (with the exception of the wake-up process which is initiated by the sili server 30).

Referring now to FIG. 2, a functional block diagram of an agent system 12 in accordance with the present invention operating in a base device 14 is shown. As described above, the base device 14 may be any data processing means suitable for executing the agent system 12 of the present invention. Typically base device 14 is a computer or network of computers (e.g., corporate LAN) having resources to which a remote user would like access. More particularly, the agent system 12 provides a remote user of a RAD to access data associated with the base device (designated "base data" 36), which may be one or more storage media (hard drives, network drives, optical drives, etc.). In general, the agent system 12 is embodied in a software application which may be made available to users via conventional software distribution means, such as media (floppy or CD-ROM) distribution or download distribution (FTP, HTTP download), for example. The agent system is suitable for use on any standard data processing means including a minicomputer, a microcomputer, a UNIX® machine, a mainframe machine, a personal computer (PC) such as INTEL® based processing computer or clone thereof, an APPLE® computer or clone thereof or, a SUN® workstation, or other appropriate computer.

The illustrative agent system 12 of FIG. 2 comprises a user-interface module 38, a registration module 40, a wake-up module 42, a server communication module 44, and a job handler module 46. The user-interface module 38 comprises a conventional user-interface such as a graphical user-interface (GUI) for receiving input commands and/or displaying output to the user of the base device. For example, when a user registers the base device 14 with the remote access system 20, the user-interface module receives user preferences (e.g., user name, password, etc.) and communicates the user preferences (settings) to the registration module 40 for processing.

The registration module 40 is coupled to the user-interface module 38 and the server communication module 44. In general, the registration module 40 receives the user preferences (such as user name, password, phone number, sex, birthday, email, email password, email client, zip code, etc.) from the user during registration and communicates such user preferences to the account creation server 22 of the remote access system via the server communication module 44. In response to this communication, the account creation server 22 registers the user (and the base device) by storing the user preferences in the DB 24. When the user subsequently attempts to access the base device 14 via a RAD (16a through 16c), the user's access credentials may be verified by querying the DB 24 for the appropriate authentication information.

In the case where, the base device 14 is configured for part-time connection to the Internet 18, the wake up module 42 carries out the operation of monitoring for a "wake-up" signal from the sili server 30. Typically, this wake up signal is received via a dial-up (or modem) connection using the PSTN 34. Accordingly, the wake-up module 42 monitors the local modem for incoming calls. The wake-up signal from sili server 30 indicates among other things, that a job request is waiting from the agent system and the IP address of sili server 30. After receiving the wake-up signal, the wake-up module 42 disconnects the PSTN 34 connection with the sili server 30, and connects to the ISP 32 to thereby establish connection with the Internet 18. Further processing between the base device 14 and the remote access system 20 is handled by the server communication module 44 and the job handler module 46.

The server communication module 44 is further coupled to the job handler module 46. The server communication module 44 carries out the operation of communicating with the sili server 30 (to query/listen for job requests) and the user server modules 28 (to query for tasks). As noted above, the server communication module 44 initiates communications with the remote access system 20 to thereby provide additional security and to allow communication from the base device 14 even if behind a proxy or firewall server. When a task is received from the remote access system 20, the server communication module 44 communicates the task to the job handler module 46 for processing.

The method and operation of the agent system 12 will be more fully understood by reference to the flow charts of FIG. 3 through FIG. 5. The order of acts as shown in FIG. 3 through FIG. 5 and described herein are only exemplary, and should not be considered limiting.

Referring now to FIG. 3, as well as FIG. 1 and FIG. 2, there is generally shown the acts associated with the agent registration process in accordance with the present invention. The agent registration process is carried out to register the user of the base device 14 with the remote access system 20 to allow the user to subsequently use a RAD (16a through 16c) to access data on the registered base device 14 via remote access system 20. Prior to registration, the agent system 12 must be enabled/installed for use on the base device 14. As noted above, the agent system 12 may be made available to users via conventional distribution means.

At process 100, the agent registration process is initiated by the registration module 40: This process may be initiated manually by the user or automatically upon installation of the agent system 12 on the base device 14. Box 110 is then carried out.

At box 110, the registration module 40 queries the user for the user's name, password, and phone (modem) number for the base device. These user name and password is used to create an account with the remote access system and to authenticate the user during subsequent RAD access attempts by the user. The phone (modem) number is used by the sili server 30 for connecting to the base device 14 and indicating a "wake-up" signal during operation. Other user-related information is also determined including name, sex, birthday, email, email password, email client, zip code, for example. Box 120 is then carried out.

At box 120, the registration module 40 then determines the local TCP/IP information for the base device including, for example, ISP phone number, ISP account login credentials, IP address, gateway/router address, and proxy server (if any). The registration module 40 also determines whether the base device 14 is configured for full-time or part-time connection to the Internet 18. This data is used by the agent system for establishing a connection to the Internet 18 during operation. Box 130 is then carried out.

At box 130, the user's information (name, password, modem number, etc.) is transmitted to the remote access system 20 for registration of the base device 14. In response to this registration request, an account for the user of the base device 14 is created and stored in the DB 24. This account data may later be queried to authenticate the user when accessing RAD devices (16*a* through 16*c*). The registration process is then completed at 140. The agent system is now configured for use with the remote access system 20 and carries out the operation described in FIG. 4 and FIG. 5 below.

Referring now to FIG. 4, as well as FIG. 1 through FIG. 3, there is generally shown the acts associated with a part-time internet connection process of the agent system in accordance with the present invention. FIG. 5, described more fully below, shows the acts associated with a full-time internet connection, although it will readily apparent to those skilled in the art, that the process described herein for a part-time internet connection is also suitable for use with base devices having full-time internet connections. During startup of the base device 14, the agent system 12 is also initiated, normally automatically as a startup process. Depending on whether the agent system 12 is configured for part-time or full-time internet connection, the agent system 12 begins process 200 (part-time) of FIG. 4 or process 300 (full-time) of FIG. 5. The configuration of agent system 12 may be modified by the user via the user-interface module 38.

At process 200, the agent system configured for part-time connection is initiated. Box 210 is then carried out.

At box 210, the wake-up module 42 monitors the local modem (and PSTN connection) for an incoming call and wake-up signal from the sili server 30. When the wake-up signal is received, box 220 is then carried out.

At box 220, the wake-up module 42 receives from the sili server 30 connection data information. This connection data information indicates, among other things, that a task is waiting for the base device 14 and the IP address of the sili server 30. Box 230 is then carried out.

At box 230, the wake-up module 42 terminates its PSTN connection from sili server 30 after receiving the connection data information in box 220. Box 240 is then carried out.

At box 240, the wake-up module establishes a connection to the ISP designated by the user during registration (FIG. 3). This process may involve dialing the ISP access number and providing the access credentials of the user. After this internet connection is established process 250 is then carried out.

At process 250, further processes is handled according to a full-time connection processing as described in FIG. 5 below beginning with process 300. This process involves the data communication between the base device 14 and the remote access system 20 in response to requests issued by a user at one of the RAD (16*a* through 16*c*) during a session. After the user logs off the remote access system, the session is terminated and box 260 is carried out below.

At box 260 the wake-up module terminates the ISP connection established during box 240, and box 210 is carried out again.

Referring now to FIG. 5, as well as FIG. 1 through FIG. 4, there is generally shown the acts associated with a full-time connection process of the agent system in accordance with the present invention. This process is also carried during process 250 of a part-time connection process, as noted above.

At box 300, the full-time connection processing begins. Box 310 is then carried out.

At box 310, the server communication module 44 periodically transmits a job request command to the sili server 30 to determine whether there are any job requests pending from a user accessing a RAD (16*a* through 16*c*). Normally, the interval for transmission of this command is forty (40) seconds, although other time intervals may also be used. Box 320 is then carried out.

At box 320, in response to the job request command of box 310, the sili server 30 transmits with a job request reply which is received by the server communication module 44. Since the original job request command was issued by the base device, the corresponding job request reply is authorized for transmission to the base device 14, even if the base device 14 is behind a firewall, or proxy server. The job request reply will indicate, among other things, whether or not a job is pending for the agent system 12 to perform. Diamond 330 is then carried out.

At diamond 330, the server communication module 44 determines from the job request reply whether or not a job is pending. If so, box 340 is then carried out. Otherwise box 310 is repeated.

A pending job indicated that a user accessing a RAD (16*a* through 16*c*) is connected and authenticated to the remote access system 20. Once a user is authenticated by the remote access system 20 a "session" is opened. This session corresponds to tasks carded out by user while accessing the remote access system 20 and is terminated (closed) when the user logs off the remote access system 20 or is otherwise "timed out". Co-pending application Ser. No. 09/618,954 entitled METHOD AND APPARATUS FOR A SECURE REMOTE ACCESS SYSTEM, filed Jul. 19, 2000, describes more fully the session tracking process of the remote access system 20.

At box 340, the server communication module 44 has determined that a job is pending, and issues a task connection request command to a designated user server module 28 (which is identified in the job request reply of box 320). Once received by the user server module 28, a connection socket is established between the base device 14 and the user server module. Once established, the connection socket is maintained by the user server module 28 during the active session so that commands may be issued by the user server module 28 to the base device 14. Box 350 is then carried out.

At box 350, the agent communication module awaits for a task command from the designated user server module. Diamond 360 is then carried out.

At diamond 360, the server communication module 44 determines whether or not a task command has been received. If so, box 370 is then carried out. Otherwise, diamond 390 is then carried out.

At box 370, the task command issued by the user server module 28 included a task for the agent system to perform. This task may be, for example, to retrieve, store, update, or delete data. This task is assigned to the job handler module 46 for processing on the base data 36. The agent system 12 provides support for "segmenting" files as described in co-pending application Ser. No. 09/618,954, entitled METHOD AND APPARATUS FOR A SECURE REMOTE ACCESS SYSTEM, filed Jul. 19, 2000. In this way, the user server module 28 may request only a portion of a file, rather than the entire file in which case, the agents system 12 provides the requested data, whether a portion of a file or the entire file. Box 380 is then carried out.

At box 380, if data was requested by the user server module, this requested data is transmitted to the user server module 28 via task command reply data communication. If another task was requested to be performed (e.g., update or delete data), the task command reply data communication will provide a confirmation signal. Diamond 390 is then carried out.

At diamond 390, the server communication module 44 determines whether the session has closed or otherwise terminated (timed-out). Typically a signal from the user server module will be communicated in reply (box 350) to task connection command (box 340) from the user server module. If the session is closed, diamond 400 is then carried out. Otherwise, box 350 is repeated for further tasks.

At diamond 400, the agent system configured for full-time internet connection resumes operation at box 310. Otherwise, the agent system configured for part-time internet connection, resumes operation via process 410. At process 410, the part-time processing resumes via box 260 (FIG. 4).

While the above process described in FIG. 3 through FIG. 5 corresponds to communication between a single base device 14 and the remote access system 20, it will be apparent to those skilled in the art having the benefit of this disclosure that invention is equally suitable for use with a plurality of base devices, where one or more of the base devices are configured as a network of computers.

Accordingly, it will be seen that this invention provides is an agent system for communicating secure data to a secure remote access system. Although the description above contains many specificities, these should not be construed as limiting the scope of the invention but as merely providing an illustration of the presently preferred embodiment of the invention. Thus the scope of this invention should be determined by the appended claims and their legal equivalents.

What is claimed is:

1. In a base device configured to be coupled with a remote access system, a secure agent system operating within said base device comprising:
   a) a server communication module configured to initiate data communication with the remote access system; and
   b) a job handler module operatively coupled to said server communication module, said job handler configured to retrieve, store, update and delete data associated with the base device.

2. The secure agent system of claim 1, wherein said server communication module is further configured to periodically transmit task connection requests to the remote access system and receive task connection replies from the remote access system.

3. The secure agent system of claim 2, wherein said server communication module is further configured to communicate said task connection replies to said job handler module for processing.

4. The secure agent system of claim 2, wherein said server communication module is configured to transmit task connection reply data in response to said task connection replies.

5. The secure agent system of claim 1 further comprising a wake-up module operatively coupled to said server communication module, said wake-up module configured to monitor the base device for a wake-up signal and to connect the base device to a internet service provider associated with the base device when the wake module receives a wake-up signal.

6. A program storage device readable by a machine, tangibly embodying a program of instructions executable by the machine to perform a method for securely communicating data associated with a base device to a remote access system, said method comprising:
   a) initiating data communication by the base device with the remote access system;
   b) retrieving, storing, updating and deleting data associated with the base device according to commands received by the base device from the remote access system.

7. The program storage device of claim 6, said method further comprising:
   a) monitoring the base device for a wake-up signal prior to initiating data communication with the remote access system; and
   b) connecting the base device to a internet service provider associated with the base device when the wake module receives a wake-up signal.

8. A method for securely communicating data associated with a base device to a remote access system, said method comprising:
   a) initiating data communication by the base device with the remote access system;
   b) retrieving, storing, updating and deleting data associated with the base device according to commands received by the base device from the remote access system.

9. The method of claim 8, further comprising:
   a) monitoring the base device for a wake-up signal prior to initiating data communication with the remote access system; and
   b) connecting the base device to a internet service provider associated with the base device when the wake module receives a wake-up signal.

* * * * *